(12) United States Patent
Tsirkin

(10) Patent No.: US 10,776,021 B2
(45) Date of Patent: Sep. 15, 2020

(54) EXIT-LESS HOST PAGE TABLE SWITCHING AND VIRTUAL MACHINE FUNCTION DETECTION WITH MEMORY PAGES STORING AN IDENTIFICATION VALUE THAT ARE MAPPED AT THE SAME GUEST PHYSICAL ADDRESSES

(71) Applicant: Red Hat, Inc., Raleigh, NC (US)

(72) Inventor: Michael Tsirkin, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 16/201,526

(22) Filed: Nov. 27, 2018

(65) Prior Publication Data

US 2020/0167086 A1    May 28, 2020

(51) Int. Cl.
  *G06F 3/06*    (2006.01)
  *G06F 9/455*   (2018.01)

(52) U.S. Cl.
  CPC .......... *G06F 3/0631* (2013.01); *G06F 3/0604* (2013.01); *G06F 3/0679* (2013.01); *G06F 9/45558* (2013.01); *G06F 2009/45583* (2013.01)

(58) Field of Classification Search
  CPC .. G06F 3/0631; G06F 3/0604; G06F 9/45558; G06F 3/0679; G06F 2009/45583
  USPC ............... 711/154, 163, 152, 206, 6; 718/1
  See application file for complete search history.

(56) References Cited

U.S. PATENT DOCUMENTS

| | | | |
|---|---|---|---|
| 9,703,720 B2 | 7/2017 | Zmudzinski | |
| 10,248,785 B2* | 4/2019 | Tsirkin | G06F 9/45558 |
| 10,579,410 B2* | 3/2020 | Tsirkin | G06F 12/109 |
| 2013/0276057 A1* | 10/2013 | Smith | G06F 21/00 726/1 |
| 2014/0380009 A1* | 12/2014 | Lemay | G06F 12/145 711/163 |
| 2016/0048464 A1* | 2/2016 | Nakajima | G06F 12/1475 711/152 |
| 2016/0179696 A1* | 6/2016 | Zmudzinski | G06F 9/45558 711/163 |
| 2016/0291996 A1* | 10/2016 | Tsirkin | G06F 12/1491 |

(Continued)

OTHER PUBLICATIONS

Yushi Omote; Takahiro Shinagawa; Kazuhiko Kato; "Exit-Less Isolated Execution" https://www.usenix.org/conference/atc18/presentation/hua; The University of Tokyo; University of Tsukuba; Published in 2015; Retrieved on or before Sep. 21, 2018; (1 Page).

(Continued)

*Primary Examiner* — Hong C Kim
(74) *Attorney, Agent, or Firm* — K&L Gates LLP

(57) ABSTRACT

A system includes a memory, a processor, a hypervisor, and a guest supervisor. The hypervisor is configured to allocate a memory page for each page table of a set of page tables and map each memory page at the same address in each page table. The memory pages store an identification value identifying the respective page table. The guest supervisor is configured to receive control from an application operating on a first page table; retrieve a first identification value associated with the first page table; store the first identification value in guest memory; switch, at a first time, from the first page table to a second page table of the set of page tables; retrieve the first identification value stored in the guest memory; and switch, at a second time, control back to the application.

20 Claims, 7 Drawing Sheets

(56) References Cited

U.S. PATENT DOCUMENTS

| | | |
|---|---|---|
| 2017/0249458 A1 | 8/2017 | Tsirkin |
| 2018/0004680 A1 | 1/2018 | Elzur |
| 2018/0060574 A1 | 3/2018 | White et al. |
| 2018/0063083 A1* | 3/2018 | Tsirkin ............... G06F 9/45558 |
| 2018/0136867 A1* | 5/2018 | Tsirkin ............... G06F 9/45545 |
| 2018/0150311 A1* | 5/2018 | Tsirkin ............... G06F 9/45558 |
| 2019/0205259 A1* | 7/2019 | Das .................... G06F 12/1009 |

OTHER PUBLICATIONS

Zhichao Hua, Dong Du, Yubin Xia, Haibo Chen, and Binyu Zang; "EPTI: Efficient Defence against Meltdown Attack for Unpatched VMs"; ISBN 978-1-931971-44-7; Institute of Parallel and Distributed Systems, Shanghai Jiao Tong University; Jul. 11-13, 2018; Boston, MA; (13 Pages).

* cited by examiner

EXIT-LESS HOST PAGE TABLE SWITCHING AND VIRTUAL MACHINE FUNCTION DETECTION WITH MEMORY PAGES STORING AN IDENTIFICATION VALUE THAT ARE MAPPED AT THE SAME GUEST PHYSICAL ADDRESSES

BACKGROUND

Virtualization may be used to provide some physical components as logical objects in order to allow running various software modules, for example, multiple operating systems, concurrently and in isolation from other software modules, on one or more interconnected physical computer systems. Virtualization may allow, for example, for consolidating multiple physical servers into one physical server running multiple guest virtual machines in order to improve the hardware utilization rate.

Virtualization may be achieved by running a software layer, often referred to as a hypervisor, above the hardware and below the guest virtual machines. A hypervisor may run directly on the server hardware without an operating system beneath it or as an application running on a traditional operating system. A hypervisor may virtualize the physical layer and provide interfaces between the underlying hardware and guest virtual machines. Processor virtualization may be implemented by the hypervisor scheduling time slots on one or more physical processors for a guest virtual machine, rather than a guest virtual machine actually having a dedicated physical processor.

SUMMARY

The present disclosure provides new and innovative systems and methods of exit-less host page table switching and virtual machine function detection. In an example, a system includes a memory, a processor in communication with the memory, a hypervisor, and a guest supervisor. The hypervisor is configured to allocate a memory page for each page table of a set of page tables and map each respective memory page at a guest physical address in each page table of the set of page tables. Each respective memory page is mapped at the same guest physical address, and each respective memory page stores an identification value identifying the respective page table of the set of page tables. The guest supervisor is configured to map the guest physical address to a virtual address and receive control from an application operating on a first page table of the set of page tables. Responsive to receiving control, the guest supervisor is configured to retrieve a first identification value associated with the first page table stored at the virtual address. Additionally, the guest supervisor is configured to store the first identification value in guest memory, switch, at a first time, from the first page table to a second page table of the set of page tables, retrieve the first identification value stored in the guest memory, store the first identification value in a register, and switch, at a second time, control back to the application.

In an example, a method includes allocating, by a hypervisor, a memory page for each page table of a set of page tables. The method also includes mapping, by the hypervisor, each respective memory page at a guest physical address in each page table of the set of page tables. Each respective memory page is mapped at the same guest physical address and each respective memory page stores an identification value identifying the respective page table of the set of page tables. Additionally, a guest supervisor maps the guest physical address to a virtual address and receives control from an application operating on a first page table of the set of page tables. Responsive to receiving control, the guest supervisor retrieves a first identification value associated with the first page table stored at the virtual address. The guest supervisor also stores the first identification value in guest memory and switches, at a first time, from the first page table to a second page table of the set of page tables. Additionally, the guest supervisor retrieves the first identification value stored in the guest memory and stores the first identification value in a register. The guest supervisor also switches, at a second time, control back to the application.

In an example, a non-transitory machine readable medium stores a program, which when executed by a processor causes a hypervisor and a guest supervisor to allocate, by the hypervisor, a memory page for each page table of a set of page tables; map, by the hypervisor, each respective memory page at a guest physical address in each page table of the set of page tables. Each respective memory page is mapped at the same guest physical address and each respective memory page stores an identification value identifying the respective page table of the set of page tables. The non-transitory machine readable medium also causes the hypervisor and guest supervisor to map, by the guest supervisor, the guest physical address to a virtual address and receive, by the guest supervisor, control from an application operating on a first page table of the set of page tables. Responsive to receiving control, the non-transitory machine readable medium causes the guest supervisor to retrieve a first identification value associated with the first page table stored at the virtual address. Additionally, the non-transitory machine readable medium causes the guest supervisor to store the first identification value in guest memory and switch, at a first time, from the first page table to a second page table of the set of page tables. The non-transitory machine readable medium also causes the guest supervisor to retrieve the first identification value stored in the guest memory and store the first identification value in a register. Furthermore, the non-transitory machine readable medium causes the guest supervisor to switch, at a second time, control back to the application.

Additional features and advantages of the disclosed method and system are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
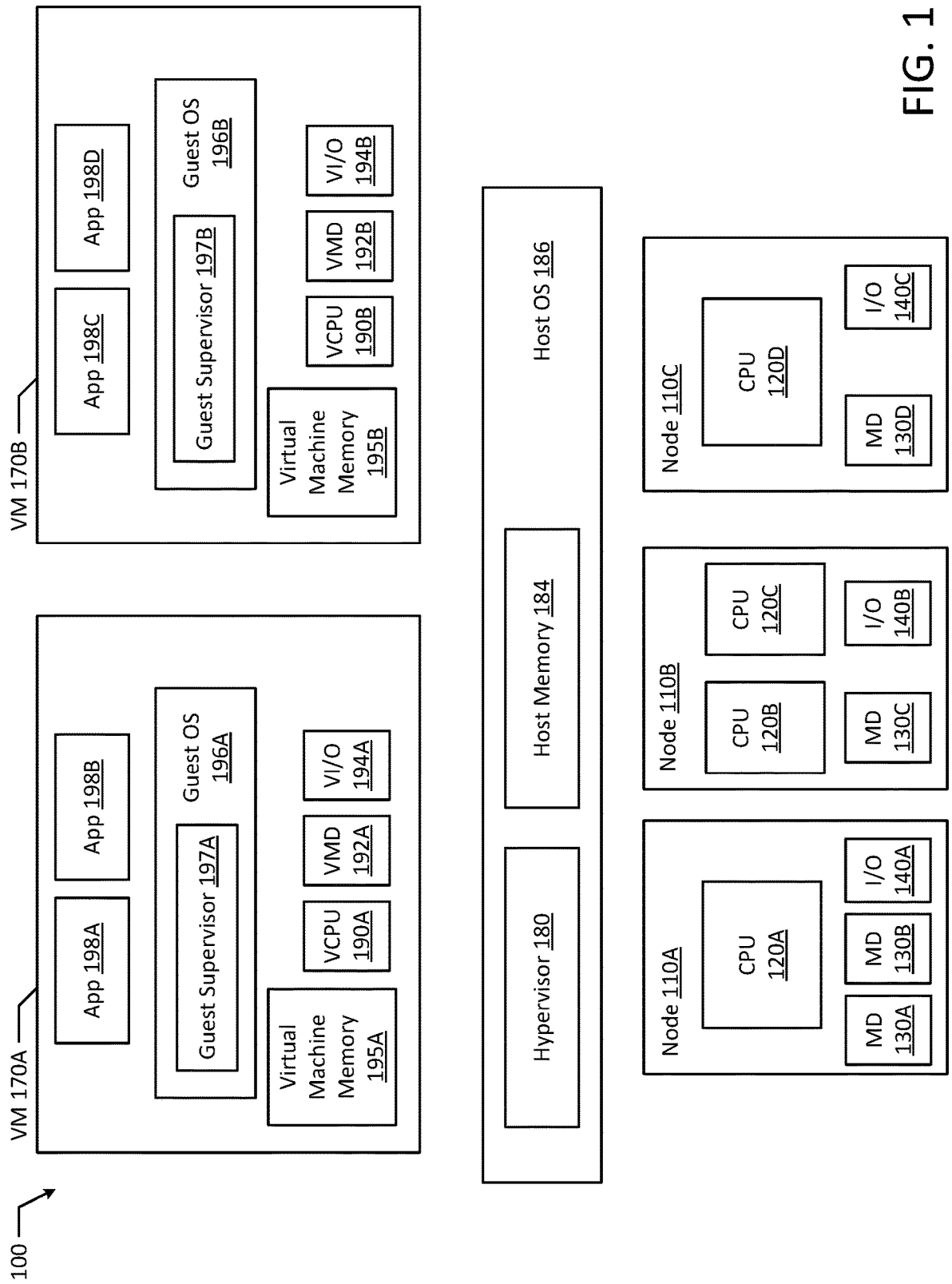
FIG. 1 illustrates a block diagram of an example computer system according to an example embodiment of the present disclosure.

Techniques are disclosed for providing exit-less host page table (e.g., extended page table ("EPT")) switching and virtual machine ("VM") function detection. In an example, host page tables may be EPTs. Current techniques of host page table (e.g., EPT) switching include a special instruction "vmfunc" supported by various processors (e.g., CPUs), which allow a set of EPTs or host page tables to be switched between by the guest. For example, host page table or EPT switching with "vmfunc" may support limited access to hypervisor memory from the guest. The special instruction "vmfunc" may be implemented for guest supervisors as well as guest applications. The instruction "vmfunc" allows high performance applications such as data plane development kit ("dpdk") to communicate with the hypervisor.

Unfortunately, if an application switches to an alternate EPT or host page table using "vmfunc", then control switches to the supervisor and the supervisor is unable to detect that the application switched to the alternate host page table. Typically, when switching between EPT or host page tables using "vmfunc," the current page table is only known to the hypervisor (an unknown to the supervisor and any other applications). However, information regarding the current page table is required to support context switching between applications running on the same processor (e.g., CPU). For example, the active page table of a set of host page tables utilized by the application needs to be saved and restored across a context switch. The guest supervisor can request this information from the hypervisor through a hypercall. However, requesting the information through a hypercall incurs overhead associated with a VM exit, which becomes computationally expensive when performing a hypercall for each context switch.

As discussed in the various example embodiments disclosed herein, to avoid a hypercall and associated overhead with each context switch, the hypervisor may allocate a memory page per supported host page table. Each memory page (e.g., one memory page per page table) is mapped at the same address in each of the host page tables. For example, each memory page may store, at an offset known to the guest supervisor, an identification of the current set of page tables. Then, when the guest supervisor gets control, the guest supervisor may load the value that identifies the current page table and store the value in guest memory. If the value does not match the required page table, the guest supervisor can switch using the "vmfunc" instruction. When switching back to the application, the guest supervisor loads the value from memory and switches back to the correct page table using the "vmfunc" instruction. If the correct page table is already active, a switch using the "vmfunc" instruction is unnecessary. By keeping track of the appropriate page tables, the system and methods disclosed herein advantageously switch to the appropriate page table without having to request information (e.g., information about what page table is the appropriate page table) via a hypercall and thereby eliminates the overhead associated with using the hypercall. Additionally, exit-less host page table switching advantageously improves processing efficiency (e.g., lower processing latency, lower power usage, etc.).

FIG. 1 depicts a high-level component diagram of an example computer system 100 in accordance with one or more aspects of the present disclosure. The computing system 100 may include an operating system (e.g., host OS 186), one or more virtual machines (VM 170A-B) and nodes (e.g., nodes 110A-C).

Virtual machines 170A-B may include a guest OS, guest memory, a virtual CPU (VCPU), virtual memory devices (VMD), and virtual input/output devices (VI/O). For example, virtual machine 170A may include guest OS 196A and associated guest supervisor 197A, guest memory or virtual machine memory 195A, a virtual CPU 190A, a virtual memory devices 192A, and virtual input/output device 194A. Virtual machine memory 195A may include one or more memory pages. Similarly, virtual machine 170B may include guest OS 196B and associated guest supervisor 197B, virtual machine memory 195B, a virtual CPU 190B, a virtual memory devices 192B, and virtual input/output device 194B. Virtual machine memory 195B may include one or more memory pages.

The guest supervisor(s) 197A-B may be a program. For example, the supervisor(s) 197A-B may refer to a privileged software component of the Guest OS 196A-B. For example, the guest supervisor(s) 197A-B may have the ability to change memory mappings for an application (e.g., Applications or Apps 170A-D). Additionally, the guest supervisor(s) 197A-B may act as a controller of multiple processes including individual user processes within an application. For example, the guest supervisor(s) 197A-B may perform several tasks such as executing processes and handling interrupts. As used herein, an application (e.g., Applications 170A-B) may refer to less privileged software without the ability to change memory mappings for itself.

The guest supervisor(s) 197A-B may be configured to map guest physical addresses to virtual addresses. Additionally, the guest supervisor(s) 197A-B may receive control from an application (e.g., applications 198A-D). Responsive to receiving control from an application (e.g., applications 198A-D), the guest supervisor(s) 197A-B may retrieve an identification value associated with the page table utilized by the application (e.g., applications 198A-D) and may store the identification value in guest memory or virtual machine memory 195A-B. Additionally, the guest supervisor(s) 197A-B may check an identification value associated with the page table the guest supervisor(s) 197A-B intends to use after gaining control from the application (e.g., applications 198A-D). If the identification values match, then the appropriate page table is already current and active, and switching to a different page table is unnecessary. If that identification values mismatch, then the guest supervisor(s) 197A-B are configured to switch to the appropriate page table by invoking a switch instruction such as a "vmfunc" instruction.

After performing tasks, the guest supervisor(s) 197A-B are also configured to return control to the application (e.g., applications 198A-D). For example, the guest supervisor(s) 197A-B may check whether the identification value of the current page table matches the identification value that the guest supervisor(s) stored in guest memory or virtual machine memory 195A-B (e.g., the identification value of the page table the application was last using). If the values match, then the guest supervisor(s) 197A-B may return control the application without switching to a different page table. However, if the identification values mismatch, then the guest supervisor(s) are configured to switch to the appropriate page table by invoking a switch instruction such as a "vmfunc" instruction.

The computing system 100 may also include a hypervisor 180 and host memory 194. The hypervisor 180 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

The hypervisor 180 may be configured to allocate a memory page (e.g., guest-writable memory page) for each page table of a set of page tables used by applications (e.g., applications 198A-D). In an example, the hypervisor 180 may be configured to map each respective memory page (e.g., guest-writable memory page) at a guest physical address in each page table. Additionally, the hypervisor 180 may be configured to create a list of EPTs and permit the guest (e.g., guest supervisor(s) 197A-B) to select a new host page table (e.g., EPT) via a privileged instruction. For example, the "vmfunc" instruction may be implemented and may identify the new host page table (e.g., EPT) that the guest wishes to switch to. This is desirable as it avoids virtual machine exits to the hypervisor 180. Exit-less host page table switching advantageously improves processing efficiency (e.g., lower processing latency, lower power usage, etc.).

In an example, a virtual machine 170A may execute a guest operating system 196A and run applications 198A-B which may utilize the underlying VCPU 190A, VMD 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186. In an example embodiment, a device may be implemented as a virtual machine (e.g., virtual machine 170A-B).

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor (e.g., CPU 120A-D) refers to a device capable of executing instructions encoding arithmetic, logical, and/or I/O operations. In one illustrative example, a processor may follow a Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as random access memory (RAM), read only memory (ROM), electrically erasable read only memory (EEPROM), or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

Figure 2:
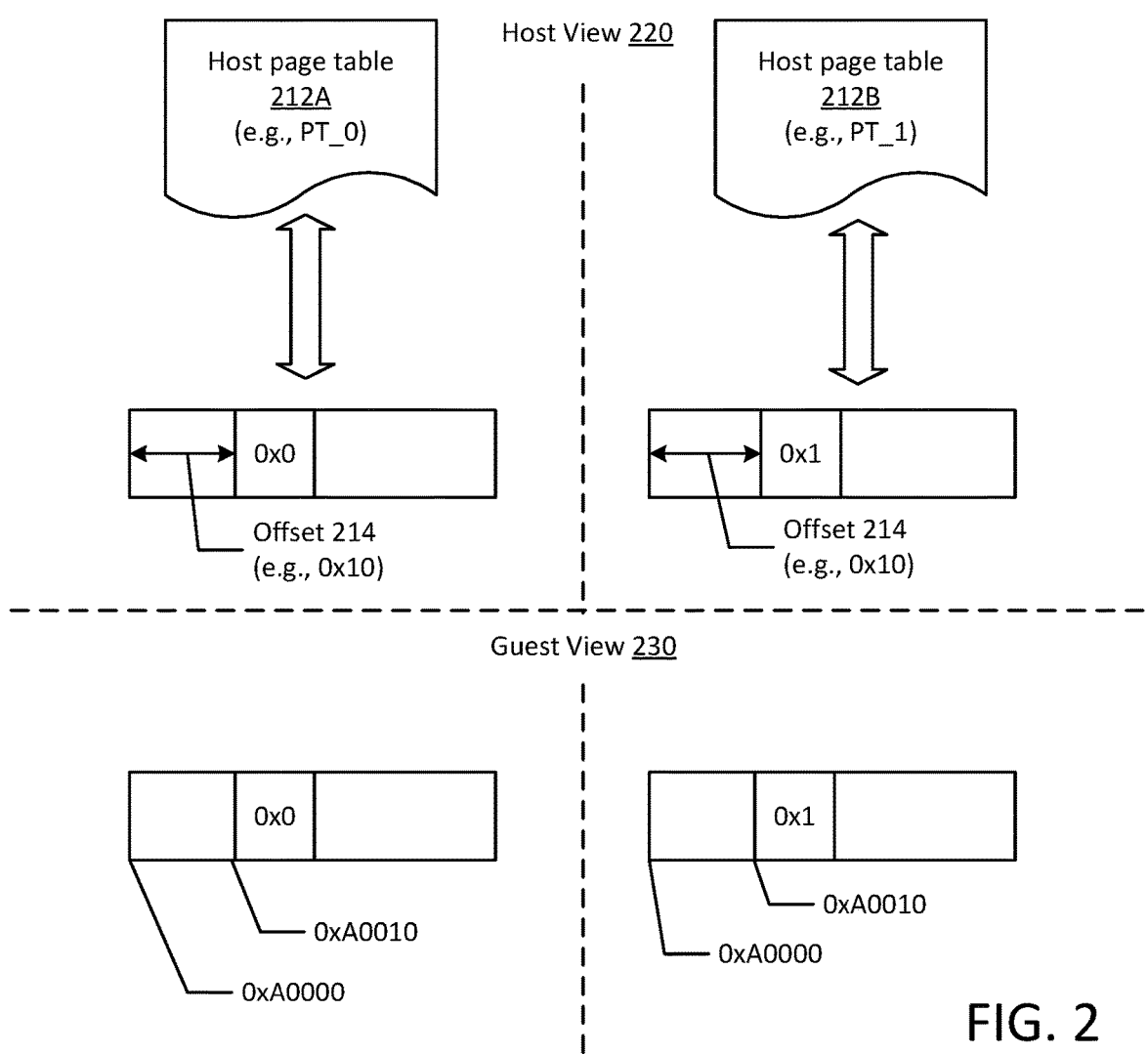
FIG. 2 illustrates an example set of page tables and memory page mappings according to an example embodiment of the present disclosure.

FIG. 2 illustrates an example set of page tables supported by hypervisor 180. For example, in host page table 212A (e.g., PT_0), the hypervisor 180 may map a guest physical address ("GPA") 0x10000 to host address 0x20000. In host page table 212B (e.g., PT_1), the hypervisor 180 may map the GPA 0x10000 to host address 0x30000. The memory page 206 at address 0x20000 may be initialized by the hypervisor 180 to contain a value 0x0 (e.g., at an offset 214 of 0x10) and the memory page 206 at address 0x30000 may be initialized by the hypervisor 180 to contain a value 0x1 (e.g., at an offset 214 of 0x10). The GPA may be mapped to a guest virtual address ("GVA") of 0xA0000.

When the guest supervisor 197A-B gets control, the guest supervisor may load the value at the GVA (e.g., 0xA0010 when accounting for offset) and store the resulting value in guest memory (e.g., within a task data structure). Then, the guest supervisor 197A-B may check the stored value and if the stored value does not match the required page table, the guest supervisor may be configured to switch to the appropriate page table via the "vmfunc" instruction. When switching back to the application, the guest supervisor may load the value stored in guest memory and determine whether the value matches the current or active page table. If the loaded value mismatches the value in the current or active page table, then the guest supervisor may be configured to switch to the correct page table prior to giving control back to the application.

In the host view 220, for the first page table 212A (e.g., PT_0), the GPA (0x10000) may be mapped to host address 0x20000. Additionally, for the second page table 212B (e.g., PT_1), the GPA (0x10000) may be mapped to host address 0x300000). Each respective memory page 206 (e.g., guest-writable memory page) stores an identification value (e.g., "0x0" or "0x1") identifying the respective page table of the set of page tables. Similarly, the guest view 230, the guest physical address (e.g., GPA 0x10000) is mapped to a virtual address (e.g., GVA 0xA0000) and the identification value (e.g., "0x0" or "0x1") may be stored at an offset or at a GVA of 0xA0010.

If the memory pages 206 are guest-writable memory pages, then the memory pages may be initialized by the guest supervisor(s) 197A-B. For example, the guest supervisor(s) 197A-B may initialize the memory pages 206 to contain the identification values (e.g., "0x0" or "0x1"). In another example, if the memory pages are read-only by the guest supervisor(s) 197A-B, then the memory pages 206 may be initialized by the hypervisor 180. For example, the hypervisor 180 may initialized the memory pages 206 to contain the identification values. Additionally, for read-only memory pages 206, the set of page tables may be shared between multiple virtual machines executed by the hypervisor 180. Then, the addresses may be selected by any guest supervisor 197A-B, the hypervisor 180, or a combination thereof, which may provide additional optimization benefits as a result of sharing the page tables.

Figure 3:
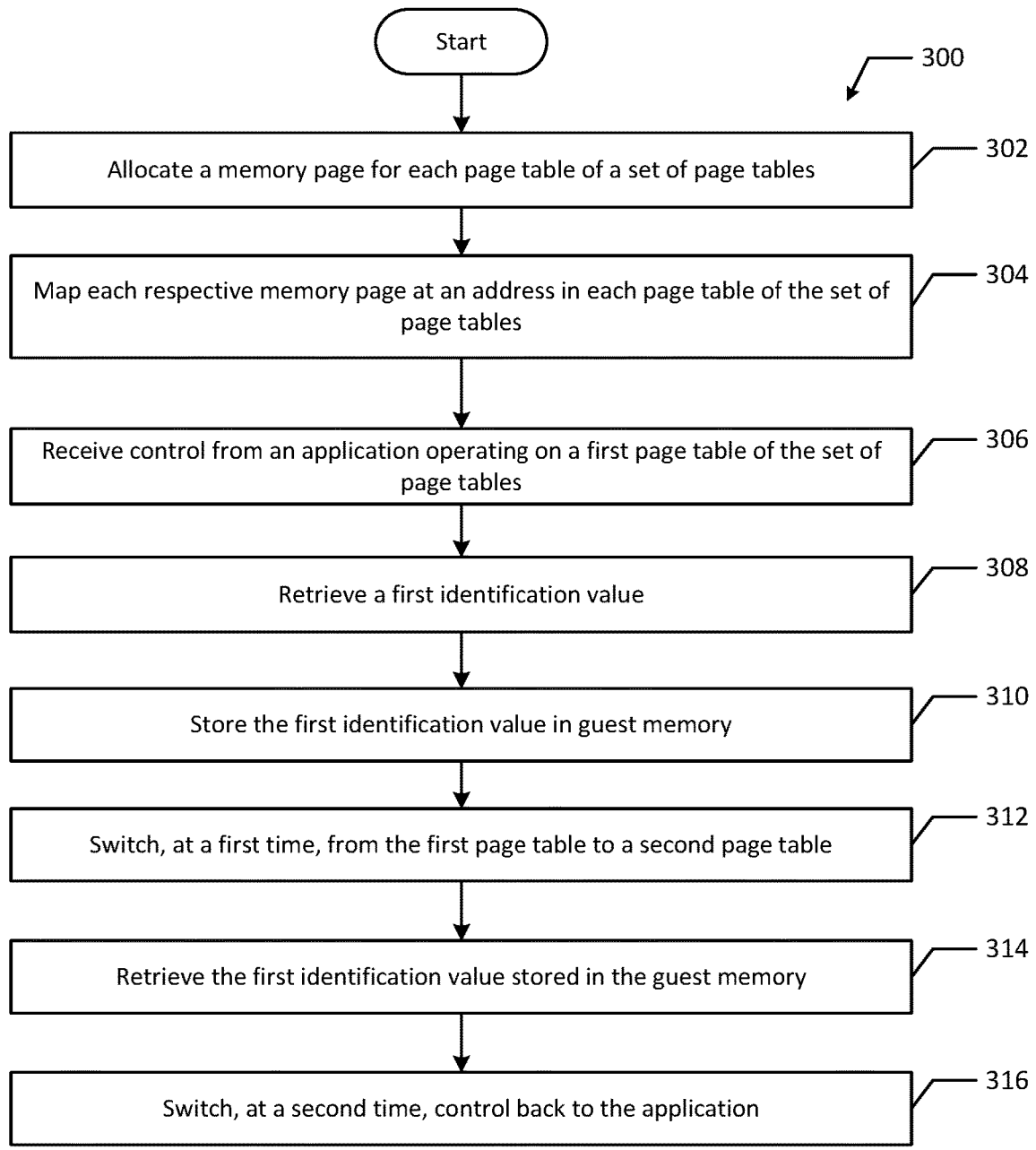
FIG. 3 illustrates a flowchart of an example process for exit-less host page table switching according to an example embodiment of the present disclosure.

FIG. 3 illustrates a flowchart of an example method 300 for exit-less host page table (e.g., EPT) switching in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

The example method 300 includes allocating a memory page for each page table of a set of page tables (block 302). For example, hypervisor 180 may allocate a memory page 206 (e.g., guest-writable memory page) for each page table 212A-B of the set of page tables. The page tables 212A-B may be extended page tables, host page tables, etc. The method also includes mapping each respective memory page at an address in each page table of the set of page tables (block 304). For example, the hypervisor 180 may map each respective memory page 206 at a guest physical address 204 (e.g., 0x10000) in each page table 212A-B of the set of page tables. Each respective memory page 206 may be mapped at the same guest physical address 204 (e.g., 0x10000). Additionally, each respective memory page 206 may store an identification value 210 (e.g., "0x0" or "0x1") identifying the respective page table 212A-B of the set of page tables. For example, a memory page 206 may be mapped at GPA (0x10000) in page table 212A and the memory page 206 may store an identification value 210 (e.g., "0x0") that identifies a first page table (e.g., PT_0). Similarly, a memory page 206 may be mapped at GPA (0x10000) in page table 212B and the memory page 206 may store an identification value 210 (e.g., "0x1") that identifies a second page table (e.g., PT_1). For the first page table 212A (e.g., PT_0), the GPA (0x10000) may be mapped to host address 0x20000 and for the second page table 212B (e.g., PT_1), the GPA (0x10000) may be mapped to host address 0x300000).

In an example, the method may include mapping the guest physical address to a virtual address. For example, a guest supervisor (e.g., guest supervisor 197A) may map the guest physical address (e.g., 0x10000) to a virtual address (e.g., 0xA0000). The method also includes receiving control from an application operating on a first page table of the set of page tables (block 306). For example, the guest supervisor 197A may receive control from an application (e.g., application 198A) operating on a first page table 212A (e.g., PT_0) of the set of page tables. In an example, the guest supervisor 197A may receive control in order to switch to a new application (e.g., application 198B) or may need to switch away from a current task. Then, the method includes retrieving a first identification value started at the virtual address (block 308). For example, responsive to receiving control from the application 198A, the guest supervisor 197A may retrieve a first identification value 210 (e.g., "0x0") associated with the first page table 212A stored at the virtual address (e.g., 0xA0000). In an example, the memory page 206 may store an identification value 210 at an offset (e.g., 0x10) such that the identification value 210 is stored at the virtual address (e.g., 0xA0010).

After retrieving the first identification value, the method includes storing the first identification value in guest memory (block 310). For example, the guest supervisor 197A may store the first identification value 210 (e.g., "0x0") in guest memory. In an example, the guest supervisor 197A may store the identification value 210 within the current task data structure. The current task data structure may be a stack pointer (e.g., each task may have its own stack pointer), an instruction pointer, an application stack, etc. Then, the method includes switching, at a first time, from the first page table to a second page table (block 312). For example, the guest supervisor 197A may switch from the first page table 212A to a second page table 212B of the set of page tables. In an example, the guest supervisor 197A may check whether the retrieved identification value 210 (e.g., 0x0) matches the identification value 210 associated with the page table that the guest supervisor plans to switch to. If the identification values 210 match, then a switch using a "vmfunc" instruction (or similar instruction) is unnecessary. By checking identification values 210 prior to automatically switching advantageously conserves resources.

The method also includes retrieving the first identification value stored in the guest memory (block 314). For example, the guest supervisor 197A may retrieve the first identification value 210 stored in the guest memory. In an example, when the guest supervisor 197A plans to switch back to the application 198A, the guest supervisor 197A may retrieve the identification value 210 (e.g., "0x0"), which indicates what page table the application 198A was using prior to switching control to the guest supervisor 197A. Additionally, the method may include storing the first identification value in a register. For example, the guest supervisor 197A may store the first identification value 210 (e.g., 0x0) in a register. In an example, the register may be an ECX register. In an example, by loading the identification value 210 into the register, the guest supervisor 197A may switch to the correct page table (e.g., PT_0) by loading the identification value 210 (e.g., 0x0) into an ECX register. The method also includes switching, at a second time, control back to the application (block 316). For example, the guest supervisor 197A may switch control back to the application 198A. In an example, after the guest supervisor loads the identification value 210 into the register (e.g., ECX register), the guest supervisor 197A may invoke the "vmfunc" instruction to switch back to the application 198A.

Additionally, the guest supervisor 197A may check whether the retrieved identification value in the guest memory (e.g. in the current task data structure) matches the current or active page table. If the identification values 210 match, then the guest supervisor 197A may switch back to the application without switching to a different page table by invoking the "vmfunc" instruction. By checking identification values 210 prior to automatically switching advantageously conserves resources.

Figure 4A:
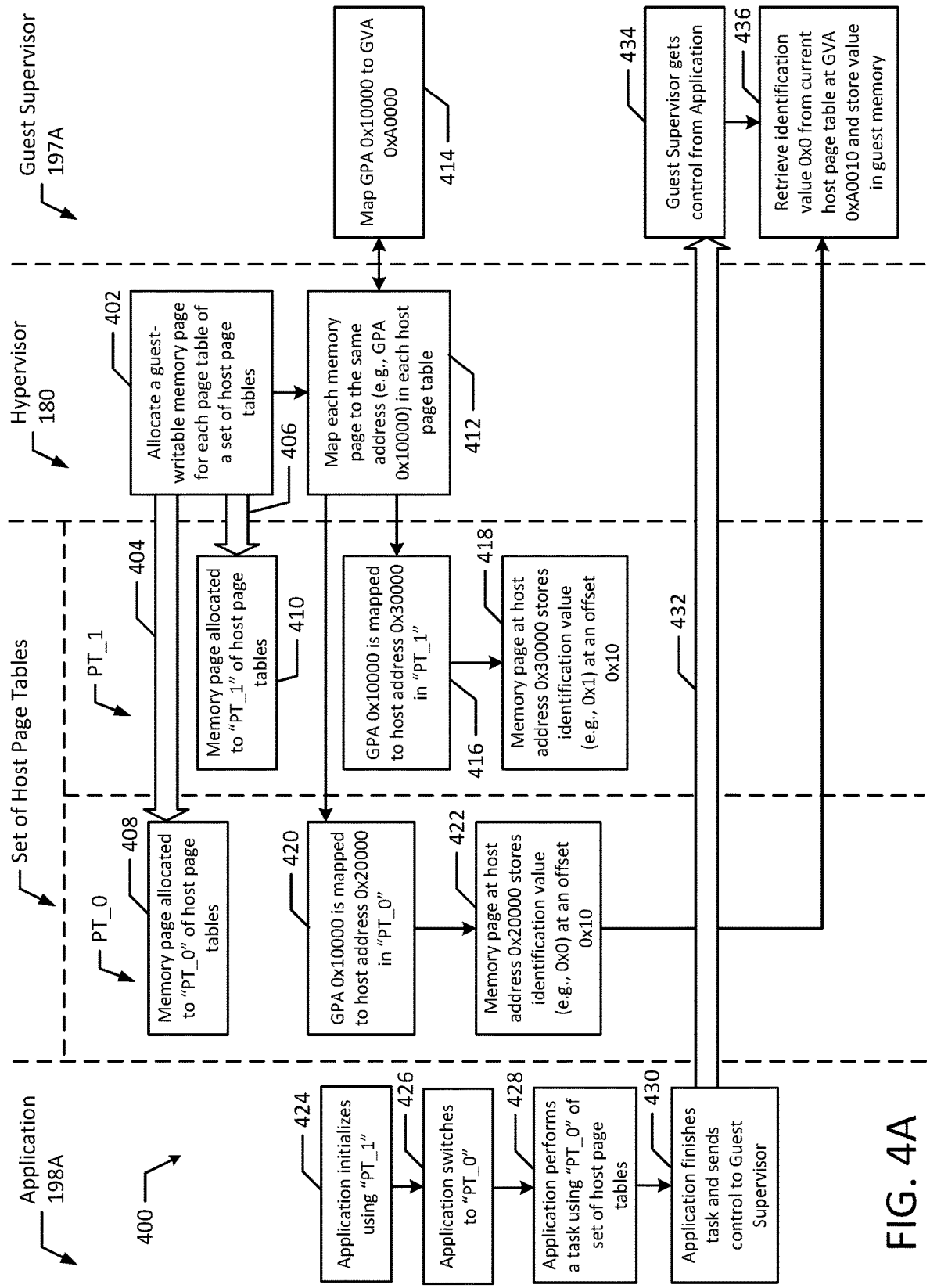
FIGS. 4A, 4B and 4C illustrate a flow diagram of an example process for exit-less host page table switching according to an example embodiment of the present disclosure.
Figure 4B:
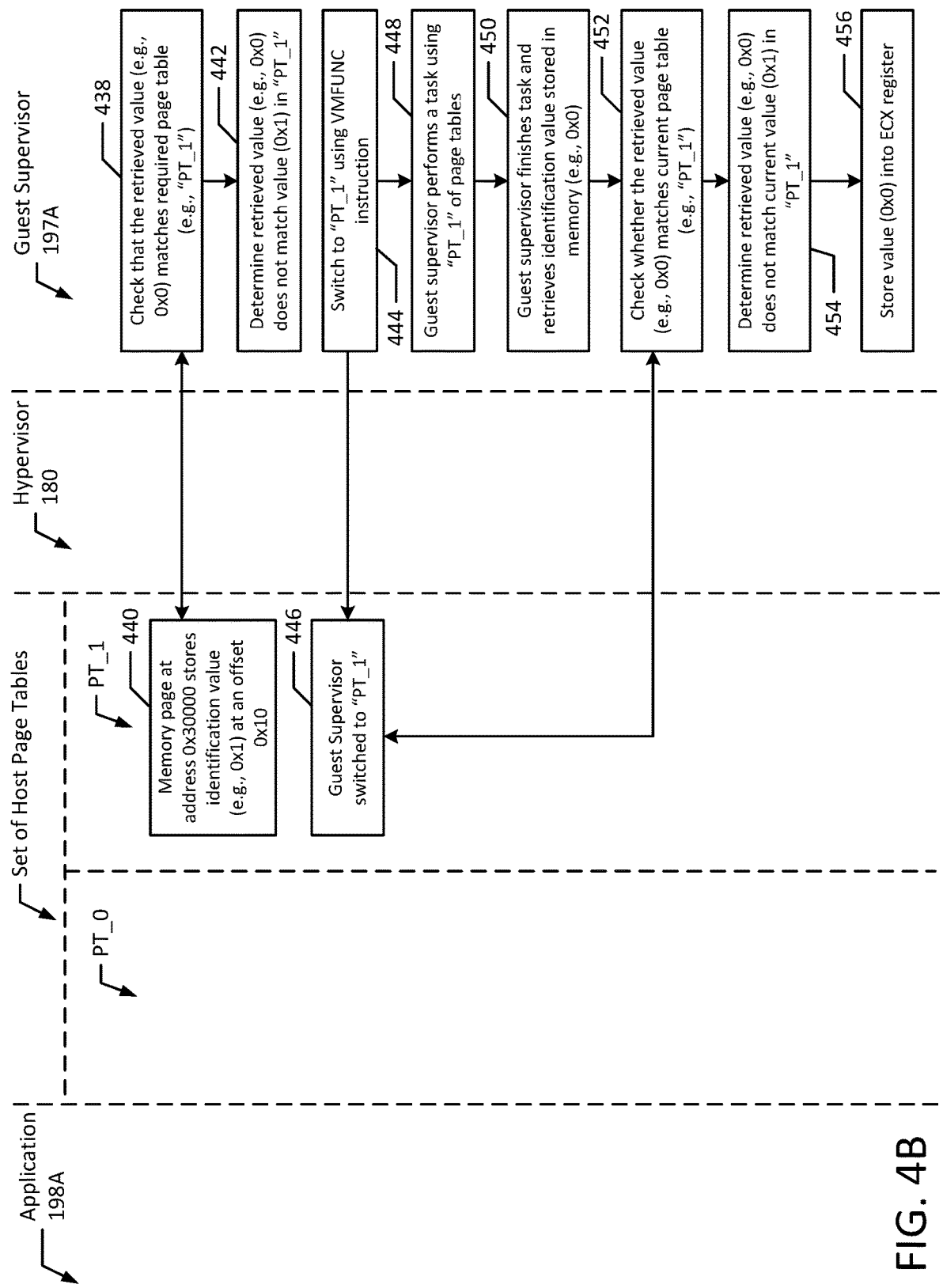
Figure 4C:
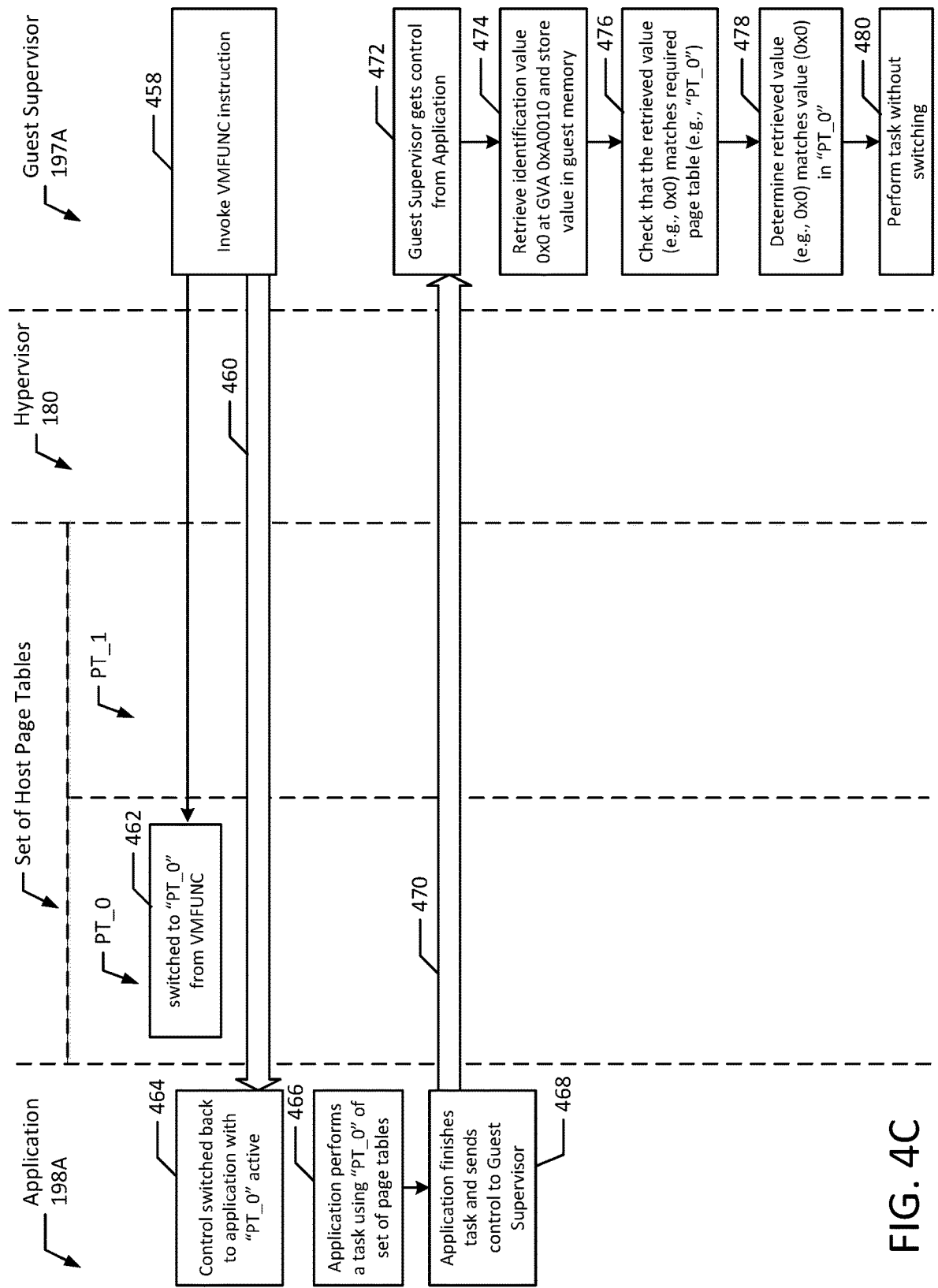

FIGS. 4A, 4B and 4C illustrate a flowchart of an example method 400 for exit-less host page table (e.g., EPT) switching using VM function detection in accordance with an example embodiment of the present disclosure. Although the example method 400 is described with reference to the flowchart illustrated in FIGS. 4A and 4B, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both. For example, hypervisor 180, guest supervisor 197A, set of host page tables 212 and application 198A may communicate to perform example method 400.

In the illustrated example, the hypervisor 180 may allocate a guest-writable memory page for each page table of a set of host page tables (blocks 402, 404 and 406). For example, the hypervisor 180 may create a list of host page tables (e.g., EPTs) and may allocated a guest-writable memory page 206 for each page table 212A-B (e.g., PT_0 and PT_1). Then, a memory page 206 is allocated to "PT_0" of the set of host page tables (block 408). Additionally, a memory page 206 is allocated to "PT_1" of the set of host page tables (block 410). The guest-writable memory pages 206 allow the guest supervisor 197A to supply information to the memory pages 206, such as identification information associated with a specific page table. The hypervisor 180 may map each memory page 206 to the same address (e.g., GPA 0x10000) in each host page table (block 412). In an example, the memory pages 206 may be mapped to the same guest physical address, but different host addresses. For example, GPA 0x10000 is mapped to host address 0x20000 in PT_0 (block 416). The memory page at host address 0x20000 stores an identification value 210 (e.g., 0x0) at an offset 0x10 (block 418). Other values may be used to identify the page table. Additionally, the identification value 210 may be stored at an offset. Similarly, GPA 0x10000 is mapped to host address 0x300000 in PT_1 (block 420) such that the memory page at host address 0x30000 stores an identification value (e.g., 0x1) at an offset 0x10 (block 422). As discussed above, other values may be used to identify the page table and the identification value 210 may be stored at an offset.

As illustrated in FIG. 4A, an application (e.g., application 198A) initializes using PT_1 (block 424). For example, application 198A may initialize and perform tasks using PT_1. Then, the application 198A switches to PT_0 (block 426). For example, the application 198A may switch to PT_0 as each page table may have a fixed number of entries and therefore describes only a portion of the entire virtual address space. The application 198A may switch to PT_0 for tasks associated with entries that cover a different portion of the virtual address space. Additionally, processes or tasks may be associated with specific page tables or specific virtual address spaces, which advantageously improves security and protects processes from one another. The application 198A performs a tasking using PT_0 of the set of host page tables (block 428). Then, the application finishes the task and sends control to the guest supervisor 197A (blocks 430 and 432). In an example, the guest supervisor 197A may receive control to switch to a new application (e.g., application 198B) or to switch away from a current task.

Then, the guest supervisor 197A gets control from the application 198A (block 434). Once the guest supervisor 197A gets control, the guest supervisor 197A may switch to another application (e.g., application 198B) or may switch away from the current task (e.g., switch to a new page table). The guest supervisor 197A retrieves the identification value "0x0" from the current host page table (e.g., PT_0) at the guest virtual address 0xA0010 and stores the identification value in guest memory (block 436). For example, the guest supervisor retrieves the identification value 210 to determine whether a page table switch is necessary and to preserve the last page table 212 that the application 198A was using prior to sending control to the guest supervisor 197A. However, the guest supervisor 197A plans to use PT_1 and checks that the retrieved value (e.g., "0x0") matches the required page table (e.g., PT_1) (block 438). By checking whether the identification values 210 match, resources may be conserved when matches are identified. Conditional switching may be optional and instead, the guest supervisor 197A may execute a switch instruction without comparing identification values 210.

As illustrated previously at block 422, the memory page at address 0x30000 stores the identification value (e.g., "0x1") at an offset of 0x10 for PT_1 (block 440). Then, the guest supervisor 197A determines that the retrieved value (e.g., "0x0") does not match the value (e.g., "0x1") in PT_1 (block 442). For example, the retrieved identification value 210 (e.g., "0x0") associated with PT_0 and the identification value 210 (e.g., "0x1") in PT_1 mismatch because they are different page tables.

Because the values mismatch, the guest supervisor 197A switches to "PT_1" using a "vmfunc" instruction (block 444). For example, the guest supervisor 197A switches access to PT_1 responsive to execution of a privileged instruction (e.g., vmfunc), which allows the guest supervisor to perform tasks associated with the portion of the memory space covered by PT_1.

Then, the guest supervisor 197A performs a task using PT_1 of the set of page tables (block 448). As discussed above, the task may be associated with a different application (e.g., 198B) or may perform a supervisor task associated with memory that is not writable by an application (e.g., application 198A). Later, guest supervisor 197A finishes the task and retrieves the identification value stored in memory (e.g., "0x0") (block 450). For example, the identification value 210 stored in memory identifies the last page table that the application 198A was using prior to sending control to the guest supervisor 197A. After retrieving the identification value, the guest supervisor 197A checks whether the retrieved value (e.g., "0x0") matches the value in the current page table (e.g., PT_1) (block 452). In another example, conditional switching may be optional and instead, the guest supervisor 197A may execute a switch instruction without comparing identification values 210. As illustrated in FIG. 4B, the guest supervisor 197A determines that the retrieved value (e.g., "0x0") does not match the current value ("0x1") in PT_1 (block 454). By determining that the identification values 210 mismatch, the guest supervisor 197A may take appropriate action to change to the proper page table before giving control back to the application 198A.

After determining that the values mismatch, the guest supervisor stores the retrieved value (e.g., "0x0") into an ECX register (block 456). Additionally, the guest supervisor 197A may also store an instruction into the register in place of the value. For example, the guest supervisor 197A may store and instruction "move 0 to ECX" in place of the value "0x0". Then, the guest supervisor 197A invokes the "vmfunc" instruction (blocks 458 and 460). By invoking the instruction, the active page table in the set of host page tables is switched from PT_1 to PT_0 (block 462). By switching to PT_0, the application 198A can regain control with its last current page table (e.g., PT_0) active so that it can advantageously continue performing tasks. Control is switched back to the application 198A with PT_0 active (block 464). Control is switched back to the application through exit-less host page table switching, which advantageously improves processing efficiency (e.g., lower processing latency, lower power usage, etc.).

Once the application has control, the application may perform tasks. For example, the application 198A may perform a task using PT_0 of the set of page tables (block 466). By restoring the appropriate page table (e.g., PT_0) and giving control back to the application 198A, the application 198A continues to perform tasks as if control was never relinquished to the guest supervisor 197A. Then, the application 198A finishes the task and sends control to the guest supervisor 197A (blocks 468 and 470). Again, the guest supervisor 197A may receive control to switch to a new application (e.g., application 198B) or to switch away from a current task.

The guest supervisor gets control from the application 198A (block 472). Once the guest supervisor 197A gets control, the guest supervisor 197A may switch to another application (e.g., application 198B) or may switch away from the current task (e.g., switch to a new page table). As discussed above, the task may be associated with a different application (e.g., 198B) or may perform a supervisor task associated with memory that is not writable by an application (e.g., application 198A). Then, the guest supervisor 197A retrieves the identification value (e.g., "0x0") at the guest virtual address 0xA0010 and stores the value in guest memory (block 474). As discussed above, the guest supervisor 197A retrieves the identification value 210 to determine whether a page table switch is necessary and to preserve the last page table 212 that the application 198A was using prior to sending control to the guest supervisor 197A. The guest supervisor also checks that the retrieved value (e.g., "0x0") matches the required page table (e.g., PT_0) (block 476). As illustrated in FIG. 4C, the guest supervisor 197A determines that the retrieved value (e.g., "0x0") matches the value (e.g., "0x0") in PT_0 (block 478). Because the values match, the guest supervisor 197A performs tasks without switching between page tables (block 480). By checking identification values 210 prior to automatically switching advantageously conserves resources.

Figure 5:
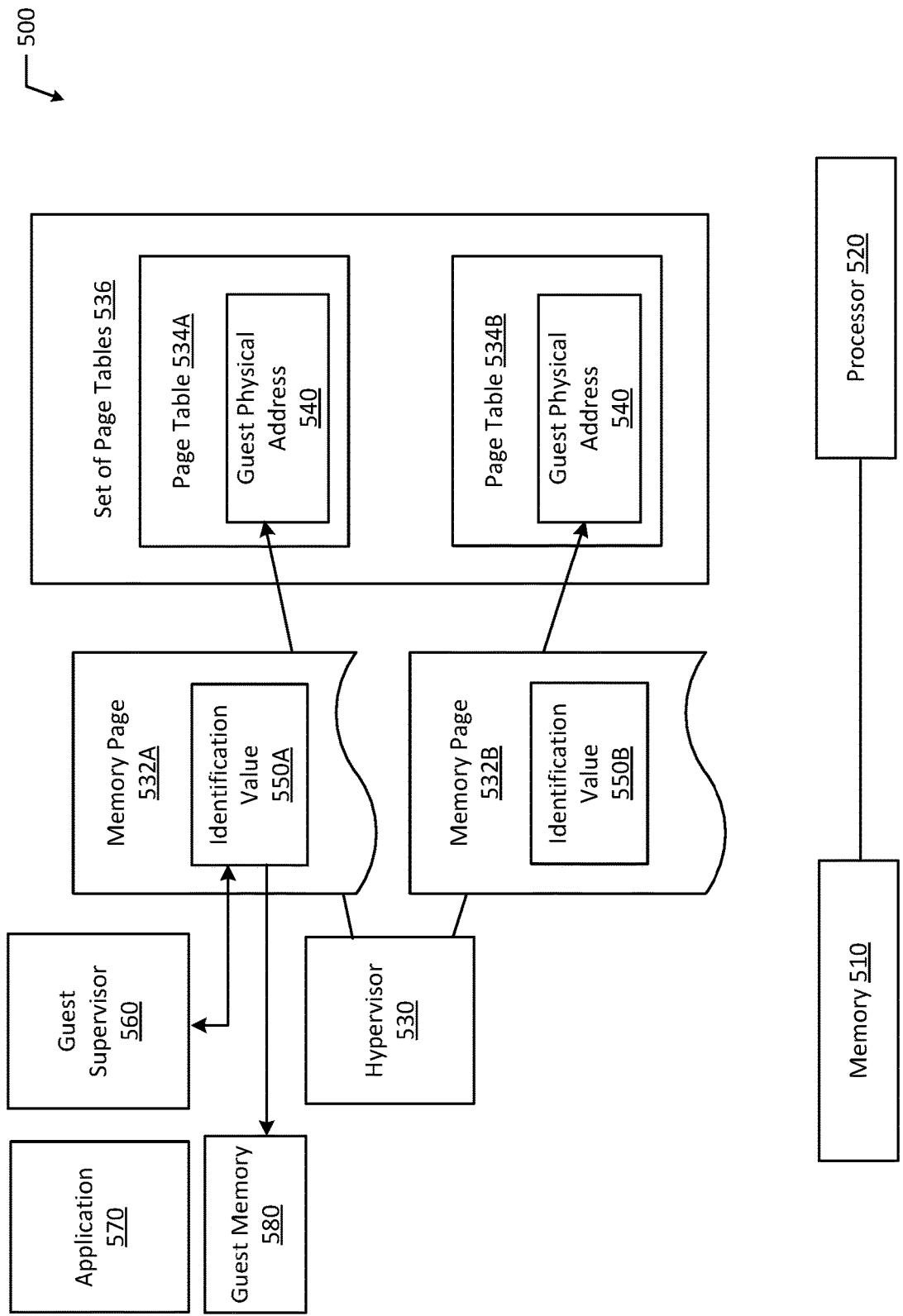
FIG. 5 illustrates a block diagram of an example exit-less page table switching system according to an example embodiment of the present disclosure.

FIG. 5 is a block diagram of an example exit-less host page table (e.g., EPT) switching system 500 according to an example embodiment of the present disclosure. The system 500 includes a memory 510, a processor 520 in communication with the memory 510, a hypervisor 530, and a guest supervisor 560. The hypervisor 530 is configured to allocate a memory page 550A-B (e.g., guest-writable memory page) for each page table 534A-B of a set of page tables 536 and map each respective memory page 534A-B at a guest physical address 540 in each page table 534A-B of the set of page tables 536. Each respective memory page 532A-B is mapped at the same guest physical address 540, and each respective memory page 532A-B stores an identification value 550A-B identifying the respective page table 534A-B of the set of page tables 536. The guest supervisor 560 is configured to receive control from an application 570 operating on a first page table 534A of the set of page tables 536. Responsive to receiving control, the guest supervisor 560 is configured to retrieve a first identification value 550A associated with the first page table 534A. Additionally, the guest supervisor 560 is configured to store the first identification value 550A in guest memory 580 and to switch, at a first time, from the first page table 534A to a second page table 534B of the set of page tables 536. The guest supervisor 560 is also configured to retrieve the first identification value 550A stored in the guest memory 580. At a second time, the guest supervisor is configured to switch control back to the application 570.

By keeping track of the appropriate page tables (e.g., via identification values 550A-B), the system 500 advantageously switches to the appropriate page table without having to request information (e.g., information about what page table is the appropriate page table) via a hypercall and thereby eliminates the overhead associated with using the hypercall. Additionally, exit-less host page table switching advantageously improves processing efficiency (e.g., lower processing latency, lower power usage, etc.).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as application specific integrated circuits (ASICs), field programmable gate arrays (FPGAs), digital signal processors (DSPs) or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claim as follows:

1. A method comprising:
   allocating a memory page for each page table of a set of page tables;
   mapping each respective memory page at a guest physical address in each page table of the set of page tables, wherein each respective memory page is mapped at the same guest physical address, and wherein each respective memory page stores an identification value identifying the respective page table of the set of page tables;
receiving control from an application operating on a first page table of the set of page tables;
responsive to receiving control, retrieving a first identification value associated with the first page table;
storing the first identification value in guest memory;
switching at a first time from the first page table to a second page table of the set of page tables;
retrieving the first identification value stored in the guest memory; and
switching at a second time control back to the application.

2. The method of claim 1, further comprising:
prior to switching at the first time, checking a second identification value stored in the second page table;
determining a status of the second identification value stored in the second page table as one of matching the first identification value and mismatching the first identification value; and
responsive to the status mismatching the first identification value, switching at the first time to the second page table by invoking a switch instruction.

3. The method of claim 1, further comprising:
storing the first identification value in a register;
prior to storing the first identification value in the register, checking the first identification value stored in the guest memory;
determining a status of the first identification value stored in the guest memory as one of matching the second identification value and mismatching the second identification value; and
responsive to the status mismatching the second identification value in the second page table, storing the first identification value in the register and invoking the switch instruction.

4. The method of claim 1, wherein the first page table and the second page table are different page tables.

5. The method of claim 1, wherein the first identification value and the second identification value are different values.

6. The method of claim 1, wherein the page tables are extended page tables and the memory page is a guest-writable memory page.

7. The method of claim 1, wherein the switch instruction is VMFUNC.

8. The method of claim 1, wherein the register is an ECX register.

9. The method of claim 1, wherein storing the identification value in the guest memory includes storing the identification value within a current task data structure.

10. The method of claim 9, wherein the current task data structure includes a pointer.

11. A system comprising:
a memory;
a processor in communication with the memory;
a hypervisor configured to:
allocate a memory page for each page table of a set of page tables, and
map each respective memory page at a guest physical address in each page table of the set of page tables, wherein each respective memory page is mapped at the same guest physical address, and wherein each respective memory page stores an identification value identifying the respective page table of the set of page tables; and a guest supervisor configured to:
receive control from an application operating on a first page table of the set of page tables,
responsive to receiving control, retrieve a first identification value associated with the first page table,
store the first identification value in guest memory,
switch, at a first time, from the first page table to a second page table of the set of page tables,
retrieve the first identification value stored in the guest memory, and
switch at a second time, control back to the application.

12. The system of claim 11, wherein the guest supervisor is further configured to:
prior to switching at the first time, check a second identification value stored in the second page table,
determine a status of the second identification value stored in the second page table as one of matching the first identification value and mismatching the first identification value, and
responsive to the status mismatching the first identification value, switch, at the first time, to the second page table by invoking a switch instruction.

13. The system of claim 11, wherein the guest supervisor is further configured to:
store the first identification value in a register;
prior to storing the first identification value in the register, check the first identification value stored in the guest memory,
determine a status of the first identification value stored in the guest memory as one of matching the second identification value and mismatching the second identification value, and
responsive to the status mismatching the second identification value in the second page table, store, the first identification value in the register and invoke the switch instruction.

14. The system of claim 11, wherein the memory page is a guest-writable memory page.

15. The system of claim 11, wherein the page tables are host page tables.

16. The system of claim 11, wherein the switch instruction is VMFUNC.

17. The system of claim 11, wherein the register is an ECX register.

18. The system of claim 11, wherein storing the identification value in the guest memory includes storing the identification value within a current task data structure.

19. The system of claim 18, wherein the current task data structure includes a pointer.

20. A non-transitory machine readable medium storing a program, which when executed by a processor causes a hypervisor and a guest supervisor to:
allocate a memory page for each page table of a set of page tables;
map each respective memory page at a guest physical address in each page table of the set of page tables, wherein each respective memory page is mapped at the same guest physical address, and wherein each respective memory page stores an identification value identifying the respective page table of the set of page tables;
receive control from an application operating on a first page table of the set of page tables;
responsive to receiving control, retrieve a first identification value associated with the first page table;
store the first identification value in guest memory;

switch at a first time from the first page table to a second page table of the set of page tables;
retrieve the first identification value stored in the guest memory; and
switch at a second time control back to the application.

* * * * *